United States Patent [19]

McConnell

[11] Patent Number: 4,735,426
[45] Date of Patent: Apr. 5, 1988

[54] TOW-A-TOT SAFETY WAGON

[75] Inventor: Darcey D. McConnell, 3605 N. 8th Ave., Sioux Falls, S. Dak. 57104

[73] Assignee: Darcey D. McConnell, Sioux Falls, S. Dak.

[21] Appl. No.: 933,856

[22] Filed: Nov. 24, 1986

[51] Int. Cl.⁴ .............................................. B62B 11/00
[52] U.S. Cl. .............................. 280/87.01; 280/47.35; 280/47.38; 297/153; 297/464; D21/71
[58] Field of Search ................... 280/30, 47.35, 47.38, 280/47.4, 87.01, 87.02 R; 297/130, 148, 153, 377, 464; D21/71

[56] References Cited

U.S. PATENT DOCUMENTS

| 1,662,292 | 3/1928 | Bender | 280/47.38 X |
| 3,223,431 | 12/1965 | Gottfried et al. | 280/47.38 |
| 3,829,113 | 8/1974 | Epelbaum | 280/30 |
| 4,082,349 | 4/1978 | Ballenger | 280/47.35 X |
| 4,227,709 | 10/1980 | Gradwohl et al. | 280/47.11 |

Primary Examiner—John J. Love
Assistant Examiner—Michael Mar

[57] ABSTRACT

A child's riding wagon, including a wagon body supported on wheels, one or two chairs on the body fitted with safety belts, a removable overhead canopy and a telescopic handle for a person to pull the wagon.

1 Claim, 1 Drawing Sheet

U.S. Patent  Apr. 5, 1988  4,735,426
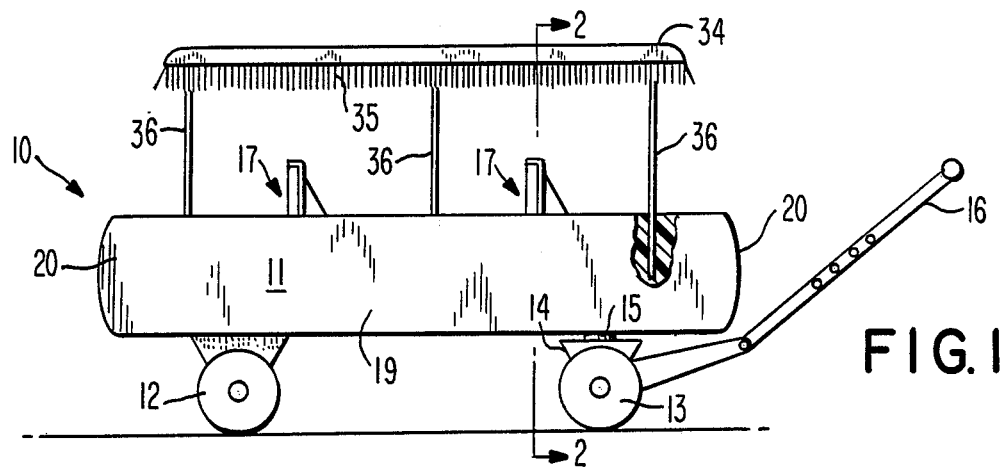
FIG. 1
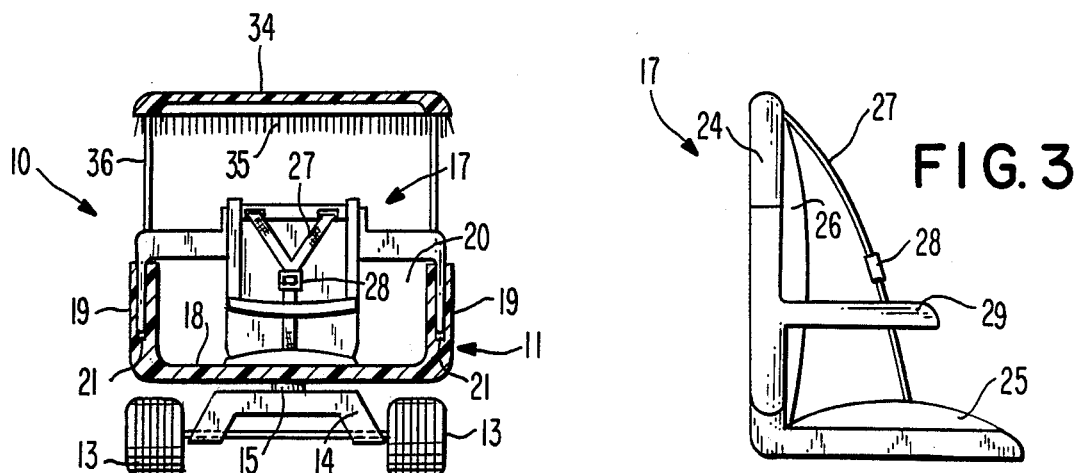
FIG. 2
FIG. 3
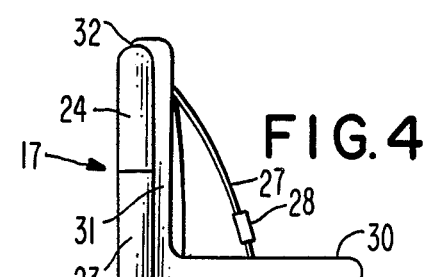
FIG. 4
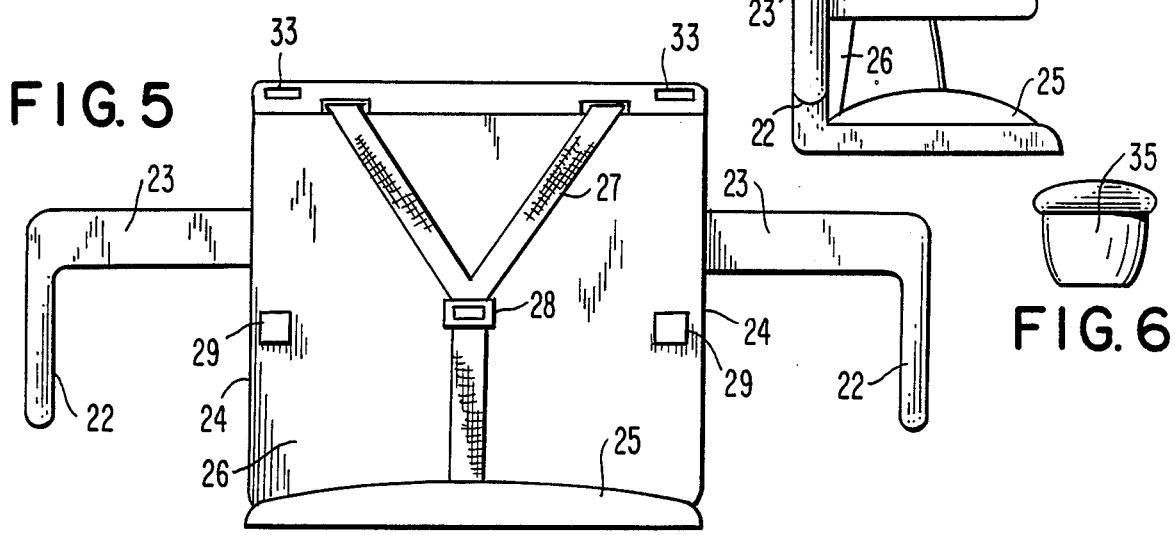
FIG. 5
FIG. 6

TOW-A-TOT SAFETY WAGON

BACKGROUND OF THE INVENTION

1. Field of the Invention

This invention relates generally to riding vehicles for use by little children. More specifically it relates to a wagon carrying a child, and which is towed by a walking person.

2. Description of Prior Art

Many such pull wagons have been designed in the past, however none are available that include restraint means that will prevent a young tot from falling over forwardly, rearwardly or to either side when the wagon is suddenly moved or sharply turned in direction. This situation is dangerous, as the child can fall out, so is in need of an improvement.

SUMMARY OF THE INVENTION

Therefore, it is a principal object of the present invention to provide a pull wagon for a young child to include a seat having a safety belt to prevent falling out; the seat being adjustable in location to fit as the child grows, or which is completely removable when the wagon is differently used.

Another object is to provide a tow-a-tot safety wagon having a removable canopy for sun or rain protection of the child.

Yet another object is to provide a tow-a-tot safety wagon having a removable tray rested on the seat arm rests for holding toys or food.

Other objects are to provide a tow-a-tot safety wagon that is simple in design, inexpensive, and fun for the child.

These and other objects will be readily evident upon a study of the following Specification and the accompanying Drawing.

BRIEF DESCRIPTION OF THE DRAWINGS

FIG. 1 is a side elevational view of a tow-a-tot safety wagon, shown in accordance with the present invention;

FIG. 2 is a cross-sectional view, taken along line 2—2 of FIG. 1;

FIG. 3 is an enlarged side elevational view of a safety seat used in the embodiment of the invention;

FIG. 4 is an enlarged side elevational view of a safety seat with a tray in the locked position;

FIG. 5 is an enlarged front elevational view of the seat and mounting rods, and

FIG. 6 is a greatly enlarged side elevational view of a plug to fill seat and canopy holes not used.

DETAILED DESCRIPTION

Referring now to the drawings in greater detail, the reference numeral 10 represents a tow-a-tot safety wagon incorporating the invention, wherein there is a wagon body 11 made of molded hard plastic so to be inexpensive in manufacture and to be smoothly safe for a child. The body is mounted upon a pair of rear wheels 12 and a pair of front wheels 13 of a wheel truck 14 directionally turnable on a post 15 and to which a telescopically adjustable handle 16 is attached for a person to pull the wagon.

One or two seats 17 (as shown in FIG. 1) may be installed upon the body for little tots to ride the wagon. The body includes a bottom wall 18, opposite side walls 19 and opposite end walls 20. Each side wall has a row of downwardly holes 21 for selectively receiving a peg 22 of a sidewardly extension 23 formed along each side edge 24 of the chair. Each chair includes a cushioned seat 25 and a cushioned backrest 26. A "Y"-shaped safety belt 27 fitted with adjustment buckle 28 is attached on each chair for restraining the child. The chair has a pair of arm rests 29 for the child; the arm rests also serving to support a removable tray 30 made integral with a pair of upwardly extending bars 31 which rest against a front side of the backrest; an upper end of each bar being formed with a hook 32 that hooks in an opening 33 on a top edge of the back rest, for additional support.

A removable canopy 34 having a decorative fringe 35 includes downwardly posts 36 that also slide fit into the holes 21 for support.

The wagon body, wheels and canopy may be made in any atractive colors so to appeal to children.

A plurality of rubber plugs 35, such as shown in FIG. 6, serve to close the holes 21 that are unused for support of the chairs and the canopy.

In use, if only one child rides in the wagon, the other chair may be removed to provide space to carry luggage or a shopping bag.

While various changes may be made in the detail construction, it is understood that such changes will be within the spirit and scope of the present invention, as is defined by the appended claims.

What I now claim is:

1. A safety wagon for young children comprising:
    an integral main body including a bottom wall, oppositely disposed vertical side walls, and oppositely disposed vertical end walls, each side wall having a planar top surface with a plurality of longitudinally spaced annular recesses extending downwardly into said side wall;
    a plurality of wheel assemblies for supporting said main body;
    a plurality of chairs, each chair including a seat portion, a backrest portion, a pair of arm rests secured to said backrest, a pair of openings extending through the top of said backrest, and a safety belt;
    side extension members integrally secured to each chair, each extension member extending outwardly from a side of said chair and having a downwardly extending peg adapted to be removably received within one of said annular recesses;
    a tray removably secured to each chair, said tray including a horizontal portion adapted to be supported by said arm rests and a pair of integral bars extending upwardly from the rear edge of said horizontal portion, each bar having a hook formed at its upper end for engaging one of said openings at the top of said backrest; and
    a canopy having a plurality of support posts, the lower portion of each post being removably received within one of said annular recesses.

* * * * *